(12) United States Patent
Reedy

(10) Patent No.: US 9,895,936 B2
(45) Date of Patent: Feb. 20, 2018

(54) DYNAMIC TRACTION CLEATED TIRES

(71) Applicant: Henry J. Reedy, Cary, NC (US)

(72) Inventor: Henry J. Reedy, Cary, NC (US)

( * ) Notice: Subject to any disclaimer, the term of this patent is extended or adjusted under 35 U.S.C. 154(b) by 578 days.

(21) Appl. No.: 14/509,012

(22) Filed: Oct. 7, 2014

(65) Prior Publication Data

US 2015/0020941 A1 Jan. 22, 2015

Related U.S. Application Data

(63) Continuation-in-part of application No. 13/596,001, filed on Aug. 27, 2012, now abandoned.

(60) Provisional application No. 61/527,160, filed on Aug. 25, 2011.

(51) Int. Cl.
*B60C 11/14* (2006.01)
*B60C 11/16* (2006.01)

(52) U.S. Cl.
CPC ...... *B60C 11/1606* (2013.01); *B60C 11/1625* (2013.01); *B60C 11/1637* (2013.01)

(58) Field of Classification Search
CPC . B60C 11/16; B60C 11/1606; B60C 11/1637; B60C 11/1643; B60C 11/165; B60C 11/1656; B60C 11/1662; B60C 11/1668; B60C 11/1675; B60C 11/1681; B60C 11/1687; B60C 11/1693
USPC ......................................... 152/210, 211, 212
See application file for complete search history.

(56) References Cited

U.S. PATENT DOCUMENTS

| | | | | |
|---|---|---|---|---|
| 1,133,066 | A | * | 3/1915 | Seipp ...................... B60C 11/16 152/211 |
| 1,307,208 | A | * | 6/1919 | Muntz ..................... B60C 11/16 152/210 |
| 1,487,623 | A | * | 3/1924 | Thompson .............. B60C 27/16 152/169 |

FOREIGN PATENT DOCUMENTS

EP 0412170 2/1991

OTHER PUBLICATIONS

Written Opinion of the International Searching Authority in PCT/US2012/052581 dated Jan. 28, 2013.
International Search Report in PCT/US2012/052581 dated Aug. 27, 2012.

* cited by examiner

*Primary Examiner* — Michael H. Wilson
*Assistant Examiner* — Kendra Ly

(57) ABSTRACT

A steel-cleated, all terrain tire has cleats that dynamically engage with changing road conditions, across slick ice and bridges, and while turning, breaking and accelerating on steep terrain. The tire design can provide stability and an enormous safety benefit in dangerous conditions, on demand, without the driver's intervention. The tire design can be used for military vehicles and aircraft, commercial jets, turboprop aircraft, heavy equipment, commercial diesel trucks, helicopters, law enforcement vehicles, fire and rescue vehicles, school buses, government vehicles, sport cars, and the like. The tire design include spring loaded cleats that can are spaced about and extend outward from the tire's surface. The spring load may be strong enough to permit the cleat to penetrate ice and the like, while not damaging asphalt or concrete roadways.

12 Claims, 3 Drawing Sheets

DYNAMIC TRACTION CLEATED TIRES

CROSS-REFERENCE TO RELATED APPLICATION

This application is a continuation in part of U.S. patent application Ser. No. 13/596,001, filed Aug. 27, 2012, which claims the benefit of priority of U.S. provisional application No. 61/527,160, filed Aug. 25, 2011, the contents of which are herein incorporated by reference.

BACKGROUND OF THE INVENTION

The present invention relates to cleated tires and, more particularly, to a cleated, all-terrain artic condition tire that dynamically engages cleats to changing road conditions.

Existing snow tires, all weather tires or steel belted radials have major disadvantages, limitations and lose traction in hazardous ice conditions. Drivers must wrap their tires with traction devices, steel chains, or attach metal studs to gain the required traction to continue through difficult driving conditions, such as mountainous terrains, high elevations, ice covered bridges, sleet and snow.

Existing contraptions require forecast planning, considerable labor, do not adapt to changing road conditions and are inconvenient or unreliable.

As can be seen, there is a need for an improved tire design that can provide stability and safety benefits in dangerous arctic conditions, while turning, breaking and accelerating on steep terrain, on demand, without driver intervention.

SUMMARY OF THE INVENTION

In one aspect of the present invention, a tire comprises plurality of perforated base plate attached to a steel belt of the tire; a plurality of cylinders extending from the perforated base plate, through the tire; a plurality of load springs disposed in the cylinders; and a plurality of cleats disposed on the plurality of load springs.

In another aspect of the present invention, a tire comprises a plurality of perforated base plate attached to a steel belt of the tire; a plurality of cylinders extending from the perforated base plate, through the tire; a plurality of load springs disposed in the cylinders; and a plurality of cleats disposed on the plurality of load springs, wherein the plurality of cleats are operable to resiliently depress within treads of the tire, and the cleats are disposed in axial rows about the tire, with from about 2 to about 4 cleats disposed in each axial row.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a steel-cleated, all terrain tire that has cleats that dynamically engage with changing road conditions, across slick ice and bridges, and while turning, breaking and accelerating on steep terrain. The tire design can provide stability and an enormous safety benefit in dangerous conditions, on demand, without the driver's intervention. The tire design can be used for military vehicles and aircraft, commercial jets, turboprop aircraft, heavy equipment, commercial diesel trucks, helicopters, law enforcement vehicles, fire and rescue vehicles, school buses, government vehicles, sport cars, and the like. The tire design include spring loaded cleats that can are spaced about and extend outward from the tire's surface. The spring load may be strong enough to permit the cleat to penetrate ice and the like, while not damaging asphalt or concrete roadways.

Figure 1:
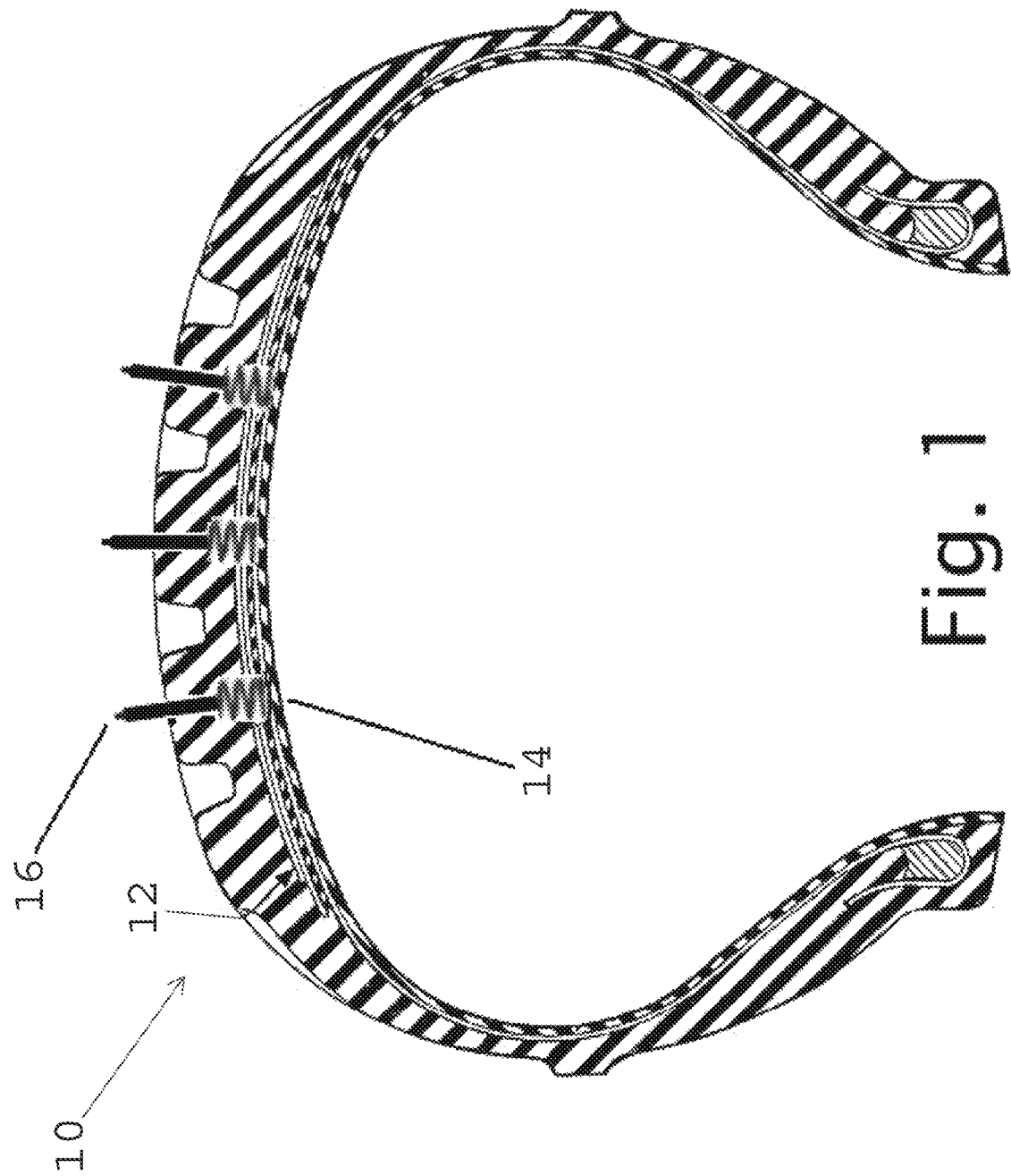
FIG. 1 is a cross-sectional view of a dynamic traction cleated tire according to an exemplary embodiment of the present invention.
Figure 2:
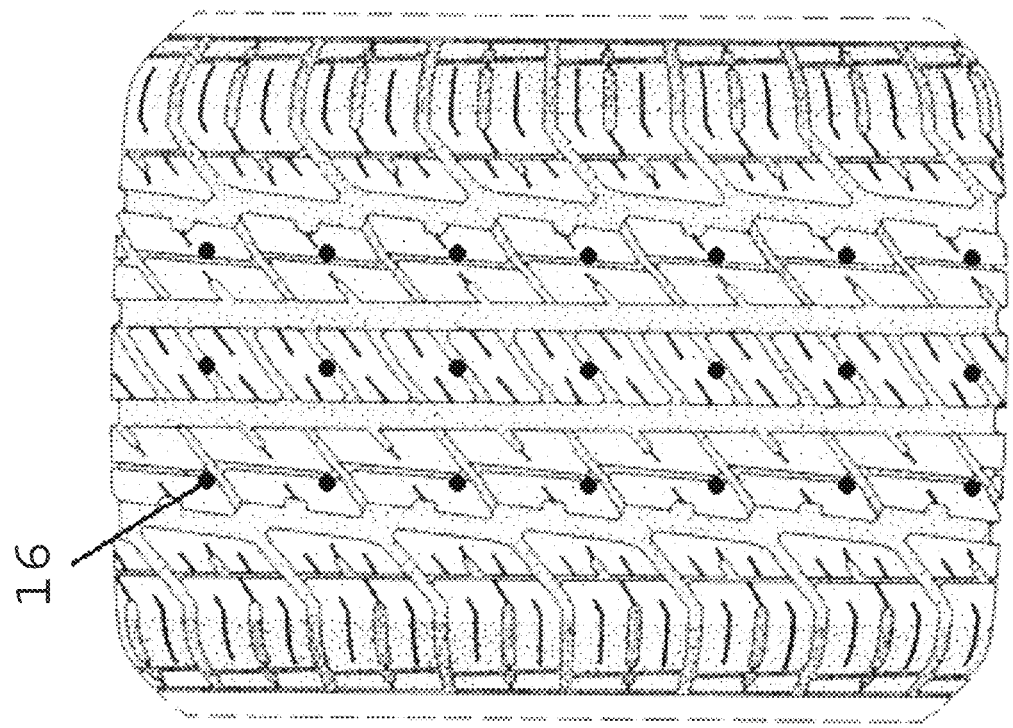
FIG. 2 is a front view of the dynamic traction cleated tire as shown in FIG. 1.
Figure 3:
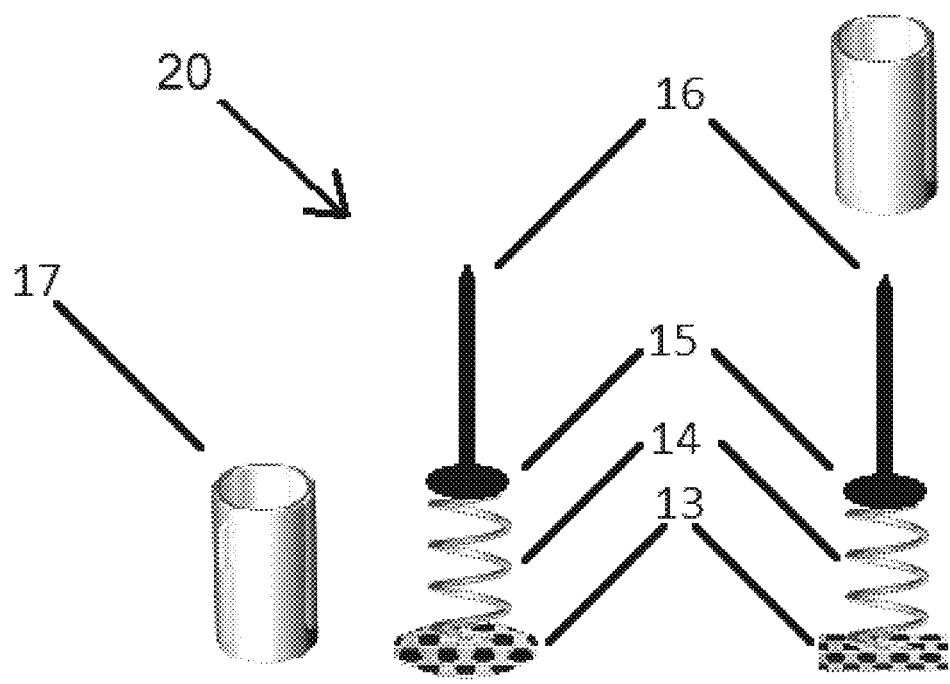
FIG. 3 is an exploded perspective view of the cleat assembly used in the dynamic traction cleated tire according to an exemplary embodiment of the present invention.

Referring now to FIGS. 1, 2 and 3 a tire 10 can include a plurality of steel belts 12, as is known in the art. A plurality of load spring cleat assemblies 30 (see FIG. 3) can be disposed in the tire 10. For example, the load spring cleat assemblies 30 can be manufactured with a flat perforated steel base plate 13 that can be bonded to a top layer of the steel belt 12 or other ply material such as rayon, nylon and polyester. In some embodiments, belt skim stock rubber can be used to bond the steel base plate 13 to the top layer of the steel belt 12 or other ply material. In some embodiments, the perforated base plate 13 can be formed in a circular shape so that it has a more symmetrical load profile than the square plate.

A spring cover 15 and a steel cylinder 17 form a chamber the length of each load spring 14 and prevent rubber from pressing into the chamber between the helices during the vulcanization process. In some embodiments, a lip can be formed in the steel cylinder 17 to prevent the spring cover 15 from coming out of the chamber formed by the spring cover 15 and the steel cylinder 17. In some embodiments, the spring 14 can be connected to the base plate 13 and the cleat 16 to prevent the cleat 16 from coming dislodged from the tire 10. In some embodiments, the spring 14, base plate 13 and cleat 16 can be formed integrally at a single component. In some embodiments, the base plate 13 can be connected to the cylinder 17.

Wedge rubber components should then be applied overlapping the perforated base plates 13 to form a chemical bond to the steel belt 12 below. Typically, the perforated base plates 13 can have a diameter at least the same size or larger that the diameter of the steel cylinder 17. In some embodiments, the base plates 13 can be from about ½ inch to about 3 inches larger than the steel cylinder 17.

The tire assembly can then be covered with overlay cap strips of rayon, nylon, polyester or Kevlar to prevent tread belt separation under high stress. The uncured rubber material is applied on the outside and the complete tire assembly is pushed through a conventional vulcanization process. This will firmly bond the perforated base plates 13 directly to the steel belt 12, bond the wedge rubber components, the overlay cap strips and outside tread together as one contiguous chemically bonded unit.

The load springs 14 can be from about ½ to about ¾ inch long, typically about ¾ inch long. The load springs can be made from various materials, such as from austenitic steel, which is a heat-resistant alloy containing cobalt, tungsten and chromium.

Cleats 16 can be attached to the load springs 14. The cleats 16 can be made from various materials, such as tungsten-carbide, nickel-steel, titanium or any other high temperature alloy or composite material. The material strength required and the durability of each type of cleat is directly dependent on the extreme environmental conditions and specifications required by the customers and end users. Certain parts and composite materials can vary widely.

Military aircraft tires will require the highest tolerances and will comply with Military Specification (MIL-PRF-5041). Passenger jet and air cargo tires must also withstand excessive heat generated during high impact landings and high speed takeoffs. Excessive heat is generated by the high gross weight of the aircraft impacting the tarmac, high speed braking friction and high rpm takeoffs.

The length and diameter of the cleats should increase proportionally in size depending on the tire diameter, tread depth, application and overall rated utility load. For example, heave equipment and aircraft tires would require much longer and larger diameter cleats than a passenger automobile.

The total number of cleats can depend on application, user specifications or the like. Typically, a row of from about two to about four, typically about three cleats, can be disposed for each inch of tire diameter. For example, a 16-inch tire can have sixteen rows of three cleats, for a total of 48 cleats.

Each cleat 16 can extend to a present length beyond an exterior surface of the tire tread by the load spring 14 which is calibrated to the load force required to pierce through solid ice. The required calibrated force can be, for example about 70 pounds. In this example, 70 pounds of force can be exerted on the ice when the load spring is fully compressed and the cleat is just emerging outward from beneath the tire tread. As the cleat penetrates through the road ice, the force tapers off to zero pounds when the cleat is fully extended. This will not damage the much harder asphalt or concrete below the ice.

The tire design of the present invention can be integrated into existing steel belted radial fabrication processes with the addition of prefabricated, regularly spaced cleats woven into the steel braided belts.

The tire design of the present invention can potentially save lives, prevent the loss of property while in transit, prevent damage to property and prevent life threatening accidents. Owners and insurance underwriters could save significant financial losses. The tires of the present invention can be used in many different markets, such as the Antarctic, Alaska, Russia, China, Greenland, Canada, Northern Europe, Japan and the United States.

Testing can be performed to road test the tires of the present invention in both standard and military applications. The springs can be compressed at the maximum RPM to measure spring lifetime in hours. The tires should be spun against asphalt, concrete, stone and other hard surfaces at high speeds as a benchmark, then road tested where stability measurements and cleat mileage can be recorded. Paired sets of aircraft tires can be tested in Alaska, Canada and the Antarctic, utilizing, for example, the Lockheed Martin C130 turboprop cargo and the Lockheed C141 jet cargo aircraft.

It should be understood, of course, that the foregoing relates to exemplary embodiments of the invention and that modifications may be made without departing from the spirit and scope of the invention as set forth in the following claims.

What is claimed is:

1. A tire comprising:
   a plurality of perforated base plates attached to a steel belt of the tire;
   a plurality of cylinders extending from the perforated base plates, through the tire;
   a plurality of load springs disposed in the cylinders; and
   a plurality of cleats disposed on the plurality of load springs.

2. The tire of claim 1, wherein the plurality of perforated base plates are perforated steel base plates.

3. The tire of claim 1, wherein the plurality of cleats are operable to resiliently depress within treads of the tire.

4. The tire of claim 1, wherein the cleats are disposed in axial rows about the tire, with from about 2 to about 4 cleats disposed in each axial row.

5. The tire of claim 4, wherein the number of axial rows is approximate equal to the diameter of the tire and the axial rows are spaced apart about an outer circumference of the tire.

6. The tire of claim 1, wherein the load springs are about ¾ inch long.

7. The tire of claim 6, wherein the cleats are about are about ½ inch long.

8. The tire of claim 1, wherein the base plates are larger than the cylinders.

9. A tire comprising:
   a plurality of perforated base plates attached to a steel belt of the tire;
   a plurality of cylinders extending from the perforated base plates, through the tire;
   a plurality of load springs disposed in the cylinders; and
   a plurality of cleats disposed on the plurality of load springs, wherein the plurality of cleats are operable to resiliently depress within treads of the tire, and
   the cleats are disposed in axial rows about the tire, with from about 2 to about 4 cleats disposed in each axial row.

10. The tire of claim 9, wherein the number of axial rows is approximate equal to the diameter of the tire.

11. The tire of claim 9, wherein:
    the load springs are about ¾ inch long; and
    the cleats are about are about ½ inch long.

12. The tire of claim 9, wherein base plates are larger than the cylinder.

* * * * *